United States Patent
Polk et al.

(10) Patent No.: US 7,612,124 B2
(45) Date of Patent: Nov. 3, 2009

(54) INK COMPOSITIONS AND RELATED METHODS

(75) Inventors: W. David Polk, Pittsburg, PA (US);
Dennis L. Faler, Glenshaw, PA (US);
Noel R. Vanier, Wexford, PA (US);
Eldon L. Decker, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 589 days.

(21) Appl. No.: 11/377,951

(22) Filed: Mar. 17, 2006

(65) Prior Publication Data

US 2006/0144290 A1 Jul. 6, 2006

Related U.S. Application Data

(63) Continuation-in-part of application No. 11/337,062, filed on Jan. 20, 2006, which is a continuation-in-part of application No. 10/876,031, filed on Jun. 24, 2004.

(60) Provisional application No. 60/482,167, filed on Jun. 24, 2003.

(51) Int. Cl.
C09D 11/00 (2006.01)
(52) U.S. Cl. .................... 523/160; 523/161
(58) Field of Classification Search ................ 523/160, 523/161
See application file for complete search history.

(56) References Cited

U.S. PATENT DOCUMENTS

| | | | |
|---|---|---|---|
| 3,389,061 A | 6/1968 | Bono | 204/32 |
| 4,499,143 A | 2/1985 | Panush | 428/336 |
| 5,106,533 A | 4/1992 | Hendrickson et al. | 252/314 |
| 5,110,881 A | 5/1992 | McBain et al. | 525/455 |
| 5,201,948 A | 4/1993 | Fasano et al. | 106/311 |
| 5,334,297 A | 8/1994 | Nakada et al. | 204/181.2 |
| 5,340,789 A | 8/1994 | Evans et al. | 503/227 |
| 5,538,548 A | 7/1996 | Yamazaki | 106/20 C |
| 5,538,549 A | 7/1996 | Kato et al. | 106/20 C |
| 5,716,435 A | 2/1998 | Aida et al. | 106/31.85 |
| 5,837,041 A | 11/1998 | Bean et al. | 106/31.6 |
| 5,902,711 A | 5/1999 | Smith et al. | 430/137 |
| 5,942,027 A | 8/1999 | Ikai et al. | 106/31.33 |
| 5,990,202 A | 11/1999 | Nguyen et al. | 523/201 |
| 5,990,219 A | 11/1999 | Sakai et al. | 524/441 |
| 6,030,440 A | 2/2000 | Sekioka et al. | 106/31.65 |
| 6,031,024 A | 2/2000 | Uraki et al. | 523/161 |
| 6,099,627 A | 8/2000 | Saibara et al. | 106/31.33 |
| 6,153,001 A | 11/2000 | Suzuki et al. | 106/31.65 |
| 6,387,997 B1 | 5/2002 | Grolemund et al. | 524/506 |
| 6,410,619 B2 | 6/2002 | Greene et al. | 524/88 |
| 6,416,818 B1 | 7/2002 | Aikens et al. | 427/383.1 |
| 6,417,249 B1 | 7/2002 | Nguyen et al. | 523/201 |
| 6,572,690 B2 | 6/2003 | Rehman et al. | 106/31.58 |
| 6,585,817 B2 | 7/2003 | Lee et al. | 106/31.58 |
| 6,592,657 B2 | 7/2003 | Lee et al. | 106/31.58 |
| 6,624,276 B2 | 9/2003 | Lamers et al. | 528/45 |
| 6,841,591 B2 | 1/2005 | Vincent et al. | 523/160 |
| 6,852,153 B2 | 2/2005 | Uhlir-Tsang et al. | 106/31.27 |
| 6,858,301 B2 | 2/2005 | Ganapathiappan | 428/407 |
| 2002/0077385 A1 | 6/2002 | Miyabayashi | 523/160 |
| 2002/0149002 A1 | 10/2002 | Womelsdorf et al. | 252/363.5 |
| 2002/0193514 A1 | 12/2002 | Wang et al. | 524/853 |
| 2003/0125417 A1 | 7/2003 | Vanier et al. | 523/171 |
| 2003/0177943 A1 | 9/2003 | Auweter et al. | 106/31.28 |
| 2004/0156994 A1 | 8/2004 | Wiese et al. | 427/372.2 |
| 2005/0159523 A1 | 7/2005 | Bremser et al. | 524/431 |
| 2005/0182169 A1 | 8/2005 | Stubbe et al. | 524/379 |
| 2005/0212159 A1 | 9/2005 | Richards et al. | 264/40.7 |
| 2005/0212171 A1 | 9/2005 | Ferencz et al. | 264/211.21 |
| 2005/0213423 A1 | 9/2005 | Ferencz et al. | 366/76.2 |
| 2005/0287348 A1 | 12/2005 | Faler et al. | 428/315.5 |

FOREIGN PATENT DOCUMENTS

| | | |
|---|---|---|
| EP | 1 006 161 A1 | 6/2000 |
| EP | 1006161 A1 | 6/2000 |
| EP | 1 125 760 A1 | 8/2001 |
| EP | 1245589 * | 10/2002 |
| EP | 1371694 A2 | 12/2003 |
| EP | 1 422 072 A1 | 5/2004 |
| EP | 1 426 422 A1 | 6/2004 |
| WO | WO 99/63006 | 12/1999 |
| WO | WO 02/14391 A2 | 2/2002 |
| WO | WO 02/26892 A1 | 4/2002 |
| WO | WO 02/062881 A2 | 8/2002 |
| WO | WO 03/095532 A1 | 11/2003 |
| WO | WO 03/095571 A1 | 11/2003 |
| WO | WO 2004/000916 A2 | 12/2003 |

* cited by examiner

*Primary Examiner*—Edward J Cain
(74) *Attorney, Agent, or Firm*—Donald R. Palladino

(57) ABSTRACT

Disclosed are ink compositions comprising a liquid vehicle and a colorant, wherein the colorant comprises polymer-enclosed color-imparting particles, wherein the particles are enclosed by a friable polymer. Also disclosed are methods for making an ink composition and methods for improving the transparency of an ink composition comprising a pigment colorant.

17 Claims, No Drawings

INK COMPOSITIONS AND RELATED METHODS

CROSS-REFERENCE TO RELATED APPLICATIONS

This application is a continuation-in-part of U.S. patent application Ser. No. 11/337,062, entitled "Aqueous Dispersions of Polymer-Enclosed Particles, Related Coating Compositions and Coated Substrates", filed Jan. 20, 2006, which is a continuation-in-part of U.S. patent application Ser. No. 10/876,031, entitled, "Aqueous Dispersions of Microparticles Having a Nanoparticulate Phase and Coating Compositions Containing The Same", filed Jun. 24, 2004, which claims the benefit of U.S. Provisional Application Ser. No. 60/482,167 filed Jun. 24, 2003, each of which are incorporated herein by reference.

FIELD OF THE INVENTION

The present invention relates to ink compositions, including ink jet ink compositions suitable for ink jet printing, as well as methods related thereto.

BACKGROUND INFORMATION

Inks, such as ink jet inks, often utilize dyes as colorants because of their high chroma, brightness, and transparency. Dyes, however, present some durability disadvantages, particularly in the water-based inks commonly employed in consumer and commercial ink jet printers. Such dyes are typically water-soluble and consequently exhibit poor print waterfastness and poor bleed control when printed next to other colors or subsequently subjected to humid conditions. Such dyes also typically have poor lightfastness and fade at different rates, depending on the color.

More recently, the ink jet ink industry has employed dispersed pigment colorants in place of dyes. The pigments are often aggregated particles comprising, for example, metal oxides or organic materials. As such, pigments typically have greater waterfastness, bleed resistance, and media-independent color properties over conventional dyes. Moreover, pigments typically exhibit far superior photo-stability than dyes. As with aggregated colorants in general, however, pigments typically exhibit a noticeable reduction in chroma and brilliance as compared to dyes. Pigments also typically have poor transparency, such that overprinted colors tend to mask underprinted colors.

As a result, it would be desirable to provide a commercially viable, readily manufacturable, pigment containing ink composition, such as an ink jet ink composition, that can exhibit the color properties of a dye based ink composition (chroma, brilliance, transparency), while maintaining the durability properties (lightfastness, waterfastness, and humidity resistance) of a pigment based ink composition. It would also be desirable to provide such ink compositions that can exhibit excellent storage stability.

SUMMARY OF THE INVENTION

In certain respects, the present invention is directed to ink compositions comprising a vehicle and a colorant, wherein the colorant comprises polymer-enclosed color-imparting particles, wherein the particles are enclosed by a friable polymer formed from a water-dispersible polymerizable material.

In other respects, the present invention is directed to methods for improving the transparency of an ink composition comprising a pigment colorant. The methods comprise including in the ink composition polymer-enclosed color-imparting particles, wherein the particles are enclosed by a friable polymer formed from a water-dispersible polymerizable material.

In still other respects, the present invention is directed to ink compositions comprising: (a) 0.5 to 10 percent by weight of a colorant comprising polymer-enclosed color-imparting particles, wherein the particles are enclosed by a friable polymer formed from a water-dispersible polymerizable material; (b) 0.1 to 50 percent by weight of an organic solvent; (c) up to 10 percent by weight of a surfactant, and (d) water.

In yet other respects, the present invention is directed to methods for making an ink composition. These methods comprise: (a) providing an aqueous dispersion of polymer-enclosed color-imparting particles comprising a friable polymer, wherein the aqueous dispersion is prepared by a method comprising (A) providing a mixture, in an aqueous medium, of (i) color-imparting nanoparticles, (ii) one or more polymerizable, ethylenically unsaturated monomers; and/or (iii) a mixture of one or more polymerizable unsaturated monomers with one or more polymers; and/or (iv) one or more polymers, and then subjecting the admixture to high stress shear conditions in the presence of an aqueous medium to particularize the admixture into polymer-enclosed color-imparting particles; or (B) providing a mixture, in an aqueous medium, of (i) color-imparting particles, (ii) a polymerizable ethylenically unsaturated monomer, and (iii) a water-dispersible polymerizable dispersant; forming the color-imparting particles into nanoparticles; and polymerizing the ethylenically unsaturated monomer and the polymerizable dispersant to form polymer-enclosed color-imparting particles comprising a water-dispersible polymer; and (b) combining the aqueous dispersion of polymer-enclosed color-imparting particles with other components of the ink composition.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As previously mentioned, certain embodiments of the present invention are directed to ink compositions. As used herein, the term "ink composition" refers to a liquid material suitable for writing or printing. In certain embodiments, the present invention is directed to ink jet ink compositions. As used herein, the term "ink jet ink composition" refers to a liquid composition suitable for use in inkjet printing, which, as will be appreciated, is a non-impact method for the production of images by the deposition of ink droplets on a substrate, such as paper, transparent film, fabric, and the like.

The ink compositions of the present invention comprise a vehicle. As used herein, the term "vehicle" refers to a liquid portion of the ink composition in which other components of the composition, such as a colorant, are dispersed or dissolved. The vehicle present in the ink compositions of the present invention may comprise an aqueous based vehicle that includes water or, in some cases, a mixture of water and an organic solvent, such as a water-soluble organic solvent. Suitable water-soluble organic solvents include, for example, aliphatic alcohols, aromatic alcohols, diols, glycol ethepoly (glycol) ethers, caprolactams, formamides, acetamines, long chain alcohols, or mixtures thereof. Specific examples of suitable organic solvents are identified in U.S. Pat. No. 6,852,153 at col. 4, lines 3 to 27, the cited portion of which being incorporated herein by reference. In certain embodiments, the organic solvent is present in the ink jet ink composition in an amount of 0.01 to 50 percent by weight, such as 0.1 to 20 percent by weight, the weight percents being based on the total weight of the ink composition.

In certain embodiments, the vehicle also comprises an acid, such as an organo-phosphonic acid. Such materials are described in U.S. Pat. No. 6,585,817 at col. 2, line 49 to col. 3, line 55 and col. 5, line 37 to col. 7, lines 8, the cited portion of which being incorporated herein by reference.

In certain embodiments of the ink compositions of the present invention, the vehicle also comprises a surfactant. Suitable surfactants include nonionic, amphoteric, and ionic surfactants. Specific examples of suitable materials are described in, for example, U.S. Pat. Nos. 6,852,153 at col. 4, lines 33 to 51; U.S. Pat. No. 6,585,817 at col. 4, line 37 to col. 5, line 4; and United States Patent Application Publication 2002/0193514 A1 at [0039], the cited portions of which being incorporated by reference herein.

In certain embodiments of the ink compositions of the present invention, the vehicle also comprises one or more of a thickener, a conductivity enhancing agent, a anti-kogating agent, a drying agent, a waterfast agent, a chelating agent, a light stabilizer, an anti-mold agent, an anti-curl agent, a stabilizer, a defoamer, a humectant, a buffer, a preservative, a biocide, and/or a viscosity modifier. For example, if desired, a buffer may be used to maintain the ink composition at a desired pH. Suitable buffers include organic-based biological buffers and inorganic buffers. In certain embodiments, the buffer is employed to provide a pH for the composition of from 3 to 9, such as 6 to 9, or, in some cases, 8 to 8.5. Specific examples of suitable buffers are set forth in U.S. Pat. No. 6,852,153 at col. 4, lines 63 to 67, the cited portion of which being incorporated herein by reference. Specific examples of suitable biocides are set forth in United States Patent Application Publication 2002/0193514 A1 at [0046], the cited portion of which being incorporated herein by reference.

In certain embodiments, the ink compositions of the present invention also include an additive to reduce puddling of the composition. Non-limiting examples of such materials, which are suitable for use in the present invention, are described in U.S. Pat. No. 6,851,153 at col. 5, line 1 to col. 6, line 9, the cited portion of which being incorporated herein by reference.

As previously indicated, the ink compositions of the present invention also comprise a colorant, wherein the colorant comprises polymer-enclosed color-imparting particles, wherein the particles are enclosed by a friable polymer.

As used herein, the term "polymer-enclosed particles" refers to particles that are at least partially enclosed by, i.e., confined within, a polymer to an extent sufficient to physically separate particles from each other within the ink composition, thereby preventing significant agglomeration of the particles. It will be appreciated, of course, that the ink compositions of the present invention may also include color-imparting particles that are not polymer-enclosed particles. As used herein, the term "color-imparting particles" refers to a particle that significantly absorbs some wavelengths of visible light, that is, wavelengths ranging from 400 to 700 nm, more than it absorbs other wavelengths in the visible region.

In certain embodiments, the color-imparting particles that are enclosed by a polymer in the ink compositions of the present invention comprise nanoparticles. As used herein, the term "nanoparticles" refers to particles that have an average particle size of less than 1 micron. In certain embodiments, the nanoparticles used in the present invention have an average particles size of 300 nanometers or less, such as 200 nanometers or less, or, in some cases, 100 nanometers or less. Therefore, in certain embodiments, the ink compositions of the present invention comprise nanoparticles that are polymer-enclosed and, therefore, are not significantly agglomerated.

For purposes of the present invention, average particle size can be measured according to known laser scattering techniques. For example, average particle size can be determined using a Horiba Model LA 90° laser diffraction particle size instrument, which uses a helium-neon laser with a wave length of 633 nm to measure the size of the particles and assumes the particle has a spherical shape, i.e., the "particle size" refers to the smallest sphere that will completely enclose the particle. Average particle size can also be determined by visually examining an electron micrograph of a transmission electron microscopy ("TEM") image of a representative sample of the particles, measuring the diameter of the particles in the image, and calculating the average primary particle size of the measured particles based on magnification of the TEM image. One of ordinary skill in the art will understand how to prepare such a TEM image and determine the primary particle size based on the magnification. The primary particle size of a particle refers to the smallest diameter sphere that will completely enclose the particle. As used herein, the term "primary particle size" refers to the size of an individual particle.

The shape (or morphology) of the particles can vary. For example, generally spherical morphologies (such as solid beads, microbeads, or hollow spheres), can be used, as well as particles that are cubic, platy, or acicular (elongated or fibrous). Additionally, the particles can have an internal structure that is hollow, porous or void free, or a combination of any of the foregoing, e.g., a hollow center with porous or solid walls. For more information on suitable particle characteristics see H. Katz et al. (Ed.), Handbook of Fillers and Plastics (1987) at pages 9-10.

Mixtures of one or more particles having different average particle sizes can be employed.

The particles, such as nanoparticles, present in the ink compositions of the present invention can be formed from polymeric and/or non-polymeric inorganic materials, polymeric and/or non-polymeric organic materials, composite materials, as well as mixtures of any of the foregoing. As used herein, "formed from" denotes open, e.g., "comprising," claim language. As such, it is intended that a composition or substance "formed from" a list of recited components be a composition comprising at least these recited components, and can further comprise other, non-recited components, during the composition's formation. Additionally, as used herein, the term "polymer" is meant to encompass oligomers, and includes without limitation both homopolymers and copolymers.

As used herein, the term "polymeric inorganic material" means a polymeric material having a backbone repeat unit based on an element or elements other than carbon. Moreover, as used herein, the term "polymeric organic materials" means synthetic polymeric materials, semi-synthetic polymeric materials and natural polymeric materials, all of which have a backbone repeat unit based on carbon.

The term "organic material," as used herein, means carbon containing compounds wherein the carbon is typically bonded to itself and to hydrogen, and often to other elements as well, and excludes binary compounds such as the carbon oxides, the carbides, carbon disulfide, etc.; such ternary compounds as the metallic cyanides, metallic carbonyls, phosgene, carbonyl sulfide, etc.; and carbon-containing ionic compounds such as metallic carbonates, for example calcium carbonate and sodium carbonate.

As used herein, the term "inorganic material" means any material that is not an organic material.

As used herein, the term "composite material" means a combination of two or more differing materials. The particles formed from composite materials generally have a hardness at their surface that is different from the hardness of the internal portions of the particle beneath its surface. More specifically, the surface of the particle can be modified in any manner well known in the art, including, but not limited to, chemically or physically changing its surface characteristics using techniques known in the art.

For example, a particle can be formed from a primary material that is coated, clad or encapsulated with one or more secondary materials to form a composite particle that has a softer surface. In certain embodiments, particles formed from composite materials can be formed from a primary material that is coated, clad or encapsulated with a different form of the primary material. For more information on particles useful in the present invention, see G. Wypych, Handbook of Fillers, 2nd Ed. (1999) at pages 15-202.

As aforementioned, the particles useful in the present invention can include any inorganic materials known in the art. Suitable particles can be formed from ceramic materials, metallic materials, and mixtures of any of the foregoing. Non-limiting examples of such ceramic materials can comprise metal oxides, mixed metal oxides, metal nitrides, metal carbides, metal sulfides, metal silicates, metal borides, metal carbonates, and mixtures of any of the foregoing. A specific, non-limiting example of a metal nitride is boron nitride; a specific, non-limiting example of a metal oxide is zinc oxide; non-limiting examples of suitable mixed metal oxides are aluminum silicates and magnesium silicates; non-limiting examples of suitable metal sulfides are molybdenum disulfide, tantalum disulfide, tungsten disulfide, and zinc sulfide; non-limiting examples of metal silicates are aluminum silicates and magnesium silicates, such as vermiculite.

In certain embodiments of the present invention, the particles comprise inorganic materials selected from aluminum, barium, bismuth, boron, cadmium, calcium, cerium, cobalt, copper, iron, lanthanum, magnesium, manganese, molybdenum, phosphorus, selenium, silicon, silver, sulfur, tin, titanium, tungsten, vanadium, yttrium, zinc, and zirconium, including oxides thereof, nitrides thereof, phosphides thereof, phosphates thereof, selenides thereof, sulfides thereof, sulfates thereof, and mixtures thereof. Suitable non-limiting examples of the foregoing inorganic particles include alumina, silica, titania, ceria, zirconia, bismuth oxide, magnesium oxide, iron oxide, aluminum silicate, boron carbide, nitrogen doped titania, and cadmium selenide.

In certain embodiments, the particles used in the present invention have a lamellar structure. Particles having a lamellar structure are composed of sheets or plates of atoms or particles in a hexagonal array. A non-limiting example of a lamellar structure is a hexagonal crystal structure. Inorganic solid particles having a lamellar fullerene (i.e., buckyball) structure are also useful in the present invention.

Non-limiting examples of suitable materials having a lamellar structure include boron nitride, graphite, metal dichalcogenides, mica, talc, gypsum, kaolinite, calcite, cadmium iodide, silver sulfide and mixtures thereof. Suitable metal dichalcogenides include molybdenum disulfide, molybdenum diselenide, tantalum disulfide, tantalum diselenide, tungsten disulfide, tungsten diselenide and mixtures thereof.

The particles can be formed from non-polymeric, organic materials. Non-limiting examples of non-polymeric, organic materials useful in the present invention include, but are not limited to, stearates (such as zinc stearate and aluminum stearate), diamond, carbon black and stearamide.

In certain embodiments, the particles used in the present invention comprise an organic pigment, such as for example, azo compounds (monoazo, di-azo, β-Naphthol, Naphthol AS, azo pigment lakes, benzimidazolone, di-azo condensation, metal complex, isoindolinone, isoindoline), and polycyclic (phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone) pigments, and mixtures of any of the foregoing. Specific examples of suitable materials are described in U.S. Pat. No. 6,585,817 at col. 5, lines 23 to 33 and United States Patent Application Publication No. 2002/0193514 A1 at [0031], the cited portions of which being incorporated herein by reference. In certain embodiments, the ink compositions of the present invention comprise an organic pigment selected from Pigment Black 7, a copper containing phthalocyanine pigment, such as Pigment Blue 15, (including Pigment Blue 15:1, Pigment Blue 15:2, Pigment Blue 15:3, Pigment Blue 15:4, and Pigment Blue 15:6), a metal-containing phthalocyanine pigment based on, for example, zinc, cobalt, iron, nickel, and the like, a metal-free phthalocyanine pigment, Pigment Blue 60, Pigment Green 7, Pigment Green 36, Pigment Red 122, Pigment Red 168, Pigment Red 170, Pigment Red 179, Pigment Red 188, Pigment Red 202, Pigment Red 209, Pigment Red 264, Pigment Violet 19, Pigment Violet 29, Pigment Yellow 74, Pigment Yellow 83, Pigment Yellow 109, Pigment Yellow 110, Pigment Yellow 128, Pigment Yellow 129, Pigment Yellow 138, Pigment Yellow 139, Pigment Yellow 150, Pigment Yellow 154, Pigment Yellow 175, Pigment Yellow 180, Pigment Yellow 181, and/or Pigment Yellow 213.

If desired, the particles described above can be formed into nanoparticles. In certain embodiments, the nanoparticles are formed in situ during formation of an aqueous dispersion of polymer-enclosed particles, which is subsequently incorporated into the ink composition of the present invention, as described in more detail below. In other embodiments, however, the nanoparticles are formed prior to their incorporation into such an aqueous dispersion. In these embodiments, the nanoparticles can be formed by any of a number of various methods known in the art. For example, the nanoparticles can be prepared by pulverizing and classifying the dry particulate material. For example, bulk pigments such as any of the inorganic or organic pigments discussed above, can be milled with milling media having a particle size of less than 0.5 millimeters (mm), or less than 0.3 mm, or less than 0.1 mm. The pigment particles typically are milled to nanoparticle sizes in a high energy mill in one or more solvents (either water, organic solvent, or a mixture of the two), optionally in the presence of a polymeric grind vehicle. If necessary, a dispersant can be included, for example, (if in organic solvent) SOLSPERSE® 32000 or 32500 available from Noveon Corporation, or (if in water) SOLSPERSE® 27000, also available from Noveon. Other suitable methods for producing the nanoparticles include crystallization, precipitation, gas phase condensation, and chemical attrition (i.e., partial dissolution).

As indicated, in certain embodiments, the ink compositions of the present invention comprise polymer-enclosed color-imparting particles that are enclosed by a friable polymer formed from a water-dispersible polymerizable material. As used herein, the term "friable polymer" refers to a polymer that is easily pulverized at ambient conditions. That is, upon removal of any liquid material in which the polymer is dispersed, the resulting solid material is easily broken into small fragments or pieces, unlike a film-forming polymer. A film-forming polymer, on the other hand, would, upon removal of liquid materials from the dispersion, form a self-supporting continuous film on at least a horizontal surface of a substrate. As used herein, the term "ambient conditions" refers to refers to surrounding conditions, which is often around one atmosphere of pressure, 50% relative humidity, and 25° C.

In certain embodiments of the present invention, the friable polymer comprises the reaction product of (i) a polymerizable polyester polyurethane, such as a water-dispersible polymerizable polyester polyurethane, and (ii) an ethylenically unsaturated monomer. As used herein, the term "polymerizable polyester polyurethane" refers to a polymer that includes a plurality of ester units,

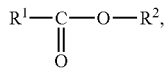

and a plurality of urethane units,

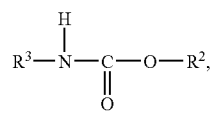

has functional groups that are capable of being polymerized to form a larger polymer, and wherein $R^1$ is an alkyl, cycloalkyl or oxyalkyl moiety, $R^2$ is an alkyl or cycloalkyl moiety, and $R^3$ is alkyl, cycloalkyl, arakyl, or aromatic moiety. In certain embodiments, the polymerizable polyester polyurethane comprises a polyester polyurethane having terminal ethylenic unsaturation. As used herein, the phrase "terminal ethylenic unsaturation" means that at least some of the terminal ends of the polyester polyurethane contain a functional group containing ethylenic unsaturation. Such polyester polyurethanes may also include, but need not necessarily include, internal ethylenic unsaturation. As a result, in certain embodiments, the ink compositions of the present invention comprise polymer-enclosed color-imparting particles, wherein such particles are enclosed by a polymer formed from a polymerizable polyester polyurethane having terminal ethylenic unsaturation which is prepared from reactants comprising (a) a polyisocyanate, (b) a polyester polyol, and (c) a material comprising an ethylenically unsaturated group and an active hydrogen group. In certain embodiments, the polymerizable polyester polyurethane utilized in the present invention is formed from reactants further comprising (d) a polyamine, and/or (e) a material comprising an acid functional group or anhydride and a functional group reactive with isocyanate or hydroxyl groups. As used herein, the term "active-hydrogen group" refers to functional groups that are reactive with isocyanates as determined by the Zerewitnoff test as described in the JOURNAL OF THE AMERICAN CHEMICAL SOCIETY, Vol. 49, page 3181 (1927).

Polyisocyanates suitable for use in preparing the polymerizable polyester polyurethane include aliphatical, cycloaliphatical, araliphatical, and/or aromatic isocyanates, and mixtures thereof.

Examples of useful aliphatic and cycloaliphatic polyisocyanates include 4,4-methylenebisdicyclohexyl diisocyanate (hydrogenated MDI), hexamethylene diisocyanate (HDI), isophorone diisocyanate (IPDI), methylenebis(cyclohexyl isocyanate), trimethyl hexamethylene diisocyanate (TMDI), meta-tetramethylxylylene diisocyanate (TMXDI), and cyclohexylene diisocyanate (hydrogenated XDI). Other aliphatic polyisocyanates include isocyanurates of IPDI and HDI.

Examples of suitable aromatic polyisocyanates include tolylene diisocyanate (TDI) (i.e., 2,4-tolylene diisocyanate, 2,6-tolylene diisocyanate or a mixture thereof), diphenylmethane-4,4-diisocyanate (MDI), naphthalene-1,5-diisocyanate (NDI), 3,3-dimethyl-4,4-biphenylene diisocyanate (TODI), crude TDI (i.e., a mixture of TDI and an oligomer thereof), polymethylenepolyphenyl polyisocyanate, crude MDI (i.e., a mixture of MDI and an oligomer thereof), xylylene diisocyanate (XDI) and phenylene diisocyanate.

Polyisocyanate derivatives prepared from hexamethylene diisocyanate, 1-isocyanato-3,3,5-trimethyl-5-isocyanatomethylcyclohexane ("IPDI"), including isocyanurates thereof, and/or 4,4'-bis(isocyanatocyclohexyl)methane are suitable.

In certain embodiments, the amount of polyisocyanate used to prepare the polymerizable polyester polyurethane ranges from 20 to 70 percent by weight, such as 30 to 60 percent by weight or, in some cases, 40 to 50 percent by weight, with the weight percents being based on the total weight of resin solids used to prepare the polymerizable polyester polyurethane.

Polyester polyols suitable for use in preparing the polymerizable polyester polyurethane may be prepared by any suitable methods, e.g., using saturated dicarboxylic acids or anhydrides thereof (or combination of acids and anhydrides) and polyhydric alcohols, or by ring opening of caprolactones, e.g., epsilon caprolactone. Such polyester polyols are commercially available in various molecular weights. Aliphatic dicarboxylic acids suitable for preparing polyesters include those containing from 4 to 14, such as 6 to 10, carbon atoms inclusive. Examples of such dicarboxylic acids include: succinic acid, glutaric acid, adipic acid, pimelic acid, suberic acid, azelaic aid and sebacic acid. Corresponding anhydrides can also be used. Typically, adipic and azelaic acids are used.

Polyhydric alcohols used in the preparation of polyester polyols suitable for use in preparing the polymerizable polyester polyurethane utilized in certain embodiments of the present invention include, without limitation, aliphatic alcohols containing at least 2 hydroxy groups, e.g., straight chain glycols containing from 2 to 15, such as 4 to 8, carbon atoms inclusive. In certain embodiments, the glycols contain hydroxyl groups in the terminal positions. Non-limiting examples of such polyhydric alcohols include ethylene glycol, diethylene glycol, triethylene glycol, tetraethylene glycol, 1,3-propane diol, 1,3-butane diol, 1,4-butane diol, 1,5-pentane diol, 2,2-dimethylpropane diol, 1,5-hexane diol, 1,7-heptane diol, 1,8-octane diol, 1,10-decane diol and mixtures of such polyhydric alcohols.

In certain embodiments, the polyester polyol is prepared by reacting a dicarboxylic acid (or anhydride thereof) with a polyhydric alcohol in the presence of an esterification catalyst, such as an organo tin catalyst. The amount of acid and alcohol used will vary and depend on the molecular weight polyester desired. Hydroxy terminated polyesters are obtained by utilizing an excess of the alcohol, thereby to obtain linear chains containing a preponderance of terminal hydroxyl groups. Examples of polyesters include: poly(1,4-butylene adipate), poly(1,4-butylene succinate), poly(1,4-butylene glutarate), poly(1,4-butylene pimelate), poly(1,4-butylene suberate), poly(1,4-butylene azelate), poly(1,4butylene sebacate) and poly(epsilon caprolactone). In certain embodiments, the polyester polyol utilized in preparing the polymerizable polyester polyurethane utilized in certain embodiments of the present invention have a weight average molecular weight from 500 to 3000, such as 500 to 2500, or, in some cases, 900 to about 1300.

In certain embodiments, the amount of polyester polyol used to prepare the polymerizable polyester polyurethane included in certain embodiments of the present invention ranges from 10 to 60 percent by weight, such as 20 to 50 percent by weight or, in some cases, 30 to 40 percent by weight, with the weight percents being based on the total weight of resin solids used to prepare the polymerizable polyester polyurethane.

As indicated, the polymerizable polyester polyurethane present in certain embodiments of the present invention is formed from a material comprising an ethylenically unsaturated group and an active hydrogen group. Suitable ethylenically unsaturated groups include, for example, acrylates, methacrylates, allyl carbamates, and allyl carbonates. The acrylate and methacrylate functional groups may be represented by the formula, $CH_2=C(R_1)-C(O)O-$, wherein $R_1$ is hydrogen or methyl. The allyl carbamates and carbonates may be represented by the formulae, $CH_2=CH-CH_2-NH-C(O)O-$, and $CH_2=CH-CH_2-O-C(O)O-$, respectively.

In certain embodiments, the material comprising an ethylenically unsaturated group and an active hydrogen group utilized in preparing the polymerizable polyester polyurethane comprises a hydroxyalkyl (meth)acrylate. Suitable hydroxyalkyl (meth)acrylates include those having from 1 to 18 carbon atoms in the alkyl radical, the alkyl radical being substituted or unsubstituted. Specific non-limiting examples of such materials include 2-hydroxyethyl (meth)acrylate, 2-hydroxypropyl (meth)acrylate, 2-hydroxybutyl (meth) acrylate, hexane-1,6-diol mono(meth)acrylate, 4-hydroxybutyl (meth)acrylate, as well as mixtures thereof. As used herein, the term "(meth)acrylate" is meant to include both acrylates and methacrylates.

In certain embodiments, the amount of the material comprising an ethylenically unsaturated group and an active hydrogen group used to prepare the polymerizable polyester polyurethane ranges from 1 to 12 percent by weight, such as 2 to 8 percent by weight or, in some cases, 4 to 6 percent by weight, with the weight percents being based on the total weight of resin solids used to prepare the polymerizable polyester polyurethane.

As previously indicated, in certain embodiments, the polymerizable polyester polyurethane present in certain embodiments of the present invention is formed from a polyamine. Useful polyamines include, but are not limited to, primary or secondary diamines or polyamines in which the groups attached to the nitrogen atoms can be saturated or unsaturated, aliphatic, alicyclic, aromatic, aromatic-substituted-aliphatic, aliphatic-substituted-aromatic and heterocyclic. Exemplary suitable aliphatic and alicyclic diamines include 1,2-ethylene diamine, 1,2-porphylene diamine, 1,8-octane diamine, isophorone diamine, propane-2,2-cyclohexyl amine, and the like. Exemplary suitable aromatic diamines include phenylene diamines and the toluene diamines, for example, o-phenylene diamine and p-tolylene diamine. These and other suitable polyamines are described in detail in U.S. Pat. No. 4,046,729 at column 6, line 61 to column 7, line 26, the cited portion of which being incorporated herein by reference.

In certain embodiments, the amount of polyamine used to prepare the polymerizable polyester polyurethane ranges from 0.5 to 5 percent by weight, such as 1 to 4 percent by weight or, in some cases, 2 to 3 percent by weight, with the weight percents being based on the total weight of resin solids used to prepare the polymerizable polyester polyurethane.

As previously indicated, in certain embodiments, the polymerizable polyester polyurethane present in certain embodiments of the present invention is formed from a material comprising an acid functional group or anhydride and a functional group reactive with the isocyanate or hydroxyl groups of other components from which the polyurethane material is formed. Similarly, as will be appreciated, suitable water-dispersible polymerizable polyester polyurethanes can also be formed from alkaline materials, such as a material comprising an amine functional group and a functional group reactive with the isocyanate or hydroxyl groups of other components from which the polyurethane is formed. Useful acid functional materials include compounds having the structure:

wherein X is OH, SH, $NH_2$, or NHR, and R includes alkyl, aryl, cycloalkyl, substituted alkyl, substituted aryl, and substituted cycloalkyl groups, and mixtures thereof; Y includes alkyl, aryl, cycloalkyl, substituted alkyl, substituted aryl, and substituted cycloalkyl groups, and mixtures thereof; and Z includes $OSO_3H$, COOH, $OPO_3H_2$, $SO_2OH$, POOH, and $PO_3H_2$, and mixtures thereof.

Examples of suitable acid functional materials include hydroxypivalic acid, 3-hydroxy butyric acid, D,L-tropic acid, D,L hydroxy malonic acid, D,L-malic acid, citric acid, thioglycolic acid, glycolic acid, amino acid, 12-hydroxy stearic acid, dimethylol propionic acid, mercapto propionic acid, mercapto butyric acid, mercapto-succinic acid, and mixtures thereof.

Useful anhydrides include aliphatic, cycloaliphatic, olefinic, cycloolefinic and aromatic anhydrides. Substituted aliphatic and aromatic anhydrides also are useful provided the substituents do not adversely affect the reactivity of the anhydride or the properties of the resultant polyurethane. Examples of substituents include chloro, alkyl and alkoxy. Examples of anhydrides include succinic anhydride, methylsuccinic anhydride, dodecenyl succinic anhydride, octadecenylsuccinic anhydride, phthalic anhydride, tetrahydrophthalic anhydride, methyltetrahydrophthalic anhydride, hexahydrophthalic anhydride, alkyl hexahydrophthalic anhydrides such as methylhexahydrophthalic anhydride, tetrachlorophthalic anhydride, endomethylene tetrahydrophthalic anhydride, trimellitic anhydride, chlorendic anhydride, itaconic anhydride, citraconic anhydride, maleic anhydride, and mixtures thereof.

As indicated, the polymerizable polyester polyurethane present in certain embodiments of the present invention is water-dispersible. As used herein, the term "water-dispersible" means that a material can be stably dispersed in water without the aid or use of a surfactant. As used herein, the term "ionizable" means a group capable of becoming ionic, i.e., capable of dissociating into ions or becoming electrically charged. For example, an acid may be neutralized with base to from a carboxylate salt group. Examples of anionic groups include $-OSO_3^-$, $-COO^-$, $-OPO_3^=$, $-SO_2O$, $-POO^-$; and $PO_3^=$. Similarly, a base may be neutralized with an acid using a material with cationic groups, such as ammonium salts and sulfonium salts.

In certain embodiments, the amount of the material comprising an acid functional group or anhydride and a functional group reactive with isocyanate or hydroxyl groups used to prepare the water-dispersible polymerizable polyester polyurethane ranges from 5 to 20 percent by weight, such as 7 to 15 percent by weight or, in some cases, 8 to 12 percent by weight, with the weight percents being based on the total weight of resin solids used to prepare the polymerizable polyester polyurethane.

As indicated, in certain embodiments, the acid groups are neutralized with a base. Neutralization can range from about 0.6 to about 1.1, such as 0.4 to 0.9 or, in some cases, 0.8 to 1.0, of the total theoretical neutralization equivalent. Suitable neutralizing agents include inorganic and organic bases such as sodium hydroxide, potassium hydroxide, ammonia, amines, alcohol amines having at least one primary, secondary, or tertiary amino group and at least one hydroxyl group. Suitable amines include alkanolamines such as monoethanolamine, diethanolamine, dimethylaminoethanol, diisopropanolamine, and the like.

The water-dispersible polymerizable polyester polyurethane utilized in certain embodiments of the present invention may be formed by combining the above-identified components in any suitable arrangement. For example, the water-dispersible polymerizable polyester polyurethane may be prepared by solution polymerization techniques understood by those skilled in the art to which the present invention pertains. The Examples herein describe a suitable method for making such a polymerizable material.

As should be apparent from the foregoing description, the water-dispersible polymerizable polyester polyurethane present in certain embodiments of the present invention can be nonionic, anionic or cationic. In certain embodiments, the polymerizable polyester polyurethane will have a weight average molecular weight of less than 150,000 grams per mole, such as from 10,000 to 100,000 grams per mole, or, in some cases, from 40,000 to 80,000 grams per mole. The molecular weight of the polyurethane and other polymeric materials used in the practice of the invention is determined by gel permeation chromatography using a polystyrene standard.

As previously indicated, in certain embodiments of the present invention, the polymer-enclosed color-imparting particles are enclosed by a friable polymer that comprises the reaction product of (i) a polymerizable polyester polyurethane, such as that previously described, and (ii) an ethylenically unsaturated monomer. Suitable ethylenically unsaturated monomers include any of the polymerizable ethylenically, unsaturated monomers, including vinyl monomers known in the art. Non-limiting examples of useful ethylenically unsaturated carboxylic acid functional group-containing monomers include (meth)acrylic acid, beta-carboxyethyl acrylate, acryloxypropionic acid, crotonic acid, fumaric acid, monoalkyl esters of fumaric acid, maleic acid, monoalkyl esters of maleic acid, itaconic acid, monoalkyl esters of itaconic acid and mixtures thereof. As used herein, "(meth)acrylic" and terms derived therefrom are intended to include both acrylic and methacrylic.

Non-limiting examples of other useful ethylenically unsaturated monomers free of carboxylic acid functional groups include alkyl esters of (meth)acrylic acids, for example, ethyl (meth)acrylate, methyl (meth)acrylate, butyl (meth)acrylate, 2-ethylhexyl (meth)acrylate, 2-hydroxyethyl (meth)acrylate, hydroxypropyl (meth)acrylate, hydroxy butyl (meth)acrylate, isobornyl (meth)acrylate, lauryl (meth)acrylate, and ethylene glycol di(meth)acrylate; vinyl aromatics such as styrene and vinyl toluene; (meth)acrylamides such as N-butoxymethyl acrylamide; acrylonitriles; dialkyl esters of maleic and fumaric acids; vinyl and vinylidene halides; vinyl acetate; vinyl ethers; allyl ethers; allyl alcohols; derivatives thereof and mixtures thereof.

The ethylenically unsaturated monomers also can include ethylenically unsaturated, beta-hydroxy ester functional monomers, such as those derived from the reaction of an ethylenically unsaturated acid functional monomer, such as a monocarboxylic acid, for example, acrylic acid, and an epoxy compound which does not participate in the free radical initiated polymerization with the unsaturated acid monomer. Examples of such epoxy compounds are glycidyl ethers and esters. Suitable glycidyl ethers include glycidyl ethers of alcohols and phenols such as butyl glycidyl ether, octyl glycidyl ether, phenyl glycidyl ether and the like.

In certain embodiments, the polymerizable polyester polyurethane and the ethylenically unsaturated monomer are present in a weight ratio of 95:5 to 30:70, such as 90:10 to 40:60, or, in some cases, from 80:20 to 60:40.

In certain embodiments, the polymer-enclosed color-imparting particles are introduced into the ink composition in the form of an aqueous dispersion of such particles. As used herein, the term "dispersion" refers to a two-phase system in which one phase includes finely divided particles distributed throughout a second phase, which is a continuous phase. These dispersions often are oil-in-water emulsions, wherein an aqueous medium provides the continuous phase of the dispersion in which the polymer-enclosed color-imparting particles are suspended as the organic phase. In certain embodiments, such an aqueous dispersion comprises polymer-enclosed color imparting particles, wherein the particles are enclosed by a friable polymer formed from a water-dispersible polymerizable material. As a result, in certain embodiments, such a dispersion is substantially free of, or, in some cases, completely free of a surfactant.

As used herein, the term "aqueous", "aqueous phase", "aqueous medium," and the like, refers to a medium that either consists exclusively of water or comprises predominantly water in combination with another material, such as, for example, an inert organic solvent. In certain embodiments, the amount of organic solvent present in the aqueous dispersions of the present invention is less than 20 weight percent, such as less than 10 weight percent, or, in some cases, less than 5 weight percent, or, in yet other cases, less than 2 weight percent, with the weight percents being based on the total weight of the dispersion. Non-limiting examples of suitable organic solvents are propylene glycol monobutyl ether, ethylene glycol monohexyl ether, ethylene glycol monobutyl ether, n-butanol, benzyl alcohol, and mineral spirits.

The aqueous dispersions comprising polymer-enclosed color-imparting particles which may be included in the ink compositions of the present invention can be prepared by any of a variety of methods. For example, in certain embodiments, such an aqueous dispersion is prepared by a method comprising (A) providing a mixture, in an aqueous medium, of (i) particles, (ii) one or more polymerizable, ethylenically unsaturated monomers; and/or (iii) a mixture of one or more polymerizable unsaturated monomers with one or more polymers; and/or (iv) one or more polymers, and then subjecting the mixture to high stress shear conditions in the presence of an aqueous medium.

Such methods are described in detail in U.S. patent application Ser. No. 10/876,031 at [0054] to [0090], incorporated by reference herein, and United States Published Patent Application 2005/0287348 at [0036] to [0050], the cited portion of which being incorporated herein by reference.

In other embodiments, however, such aqueous dispersions are made by a method comprising (1) providing a mixture, in an aqueous medium, of (i) particles, (ii) a polymerizable ethylenically unsaturated monomer, and (iii) a water-dispersible polymerizable dispersant, and (2) polymerizing the ethylenically unsaturated monomer and polymerizable dispersant to form polymer-enclosed color-imparting particles comprising a water-dispersible polymer. In these embodiments, the polymerizable dispersant may comprise any polymerizable material that is water-dispersible and which, upon polymerization with the ethylenically unsaturated monomer, produces polymer-enclosed particles comprising a water-dispersible friable polymer. In certain embodiments, the polymerizable dispersant comprises the previously described water-dispersible, polymerizable polyester polyurethane having terminal ethylenic unsaturation.

In these embodiments, the water-dispersible polymerizable dispersant is capable is dispersing itself and other materials, including the ethylenically unsaturated monomers, in the aqueous medium without the need for surfactants and/or high shear conditions. As a result, the foregoing method for making an aqueous dispersion of polymer-enclosed particles is particularly suitable in situations where use of the high stress shear conditions described U.S. patent application Ser. No. 10/876,031 at [0081] to [0084] and United States Published Patent Application No. 2005/0287348 at [0046], is not desired or feasible. Therefore, in certain embodiments, the foregoing aqueous dispersions are prepared by a method that does not include the step of subjecting the mixture of particles, polymerizable ethylenically unsaturated monomer, and water-dispersible polymerizable dispersant to high stress shear conditions.

In addition, the foregoing method enables the formation of nanoparticles in situ, rather than requiring the formation of nanoparticles prior to preparation of the aqueous dispersion. In these methods, particles having an average particle size of, for example, 1 micron or more, after being mixed with the ethylenically unsaturated monomer and the water-dispersible polymerizable dispersant in the aqueous medium, may be formed into nanoparticles (i.e., the nanoparticles are formed in situ). In certain embodiments, the nanoparticles are formed by subjecting the aqueous medium to pulverizing conditions. For example, the particles can be milled with milling media having a particle size of less than 0.5 millimeters, or less than 0.3 millimeters, or, in some cases, less than 0.1 millimeters. In these embodiments, the particles can be milled to nanoparticle size in a high energy mill in the presence of the aqueous medium, the polymerizable ethylenically unsaturated monomer, and the water-dispersible polymerizable dispersant. If desired, another dispersant can be used, such as SOLSPERSE 27000, available from Noveon.

As indicated, the foregoing methods for making aqueous dispersions include the step of free-radically polymerizing the ethylenically unsaturated monomer and polymerizable dispersant to form polymer-enclosed particles comprising a water-dispersible friable polymer. In certain embodiments, at least a portion of the polymerization occurs during formation of nanoparticles, if applicable. Also, a free radical initiator may be used. Both water and oil soluble initiators can be used.

Non-limiting examples suitable water-soluble initiators include ammonium peroxydisulfate, potassium peroxydisulfate and hydrogen peroxide. Non-limiting examples of oil soluble initiators include t-butyl hydroperoxide, dilauryl peroxide and 2,2'-azobis(isobutyronitrile). In many cases, the reaction is carried out at a temperature ranging from 20° to 80° C. The polymerization can be carried out in either a batch or a continuous process. The length of time necessary to carry out the polymerization can range from, for example, 10 minutes to 6 hours, provided that the time is sufficient to form a polymer in situ from the one or more ethylenically unsaturated monomers.

Once the polymerization process is complete, the resultant product is a stable dispersion of polymer-enclosed color-imparting particles in an aqueous medium which can contain some organic solvent. Some or all of the organic solvent can be removed via reduced pressure distillation at a temperature, for example, of less than 40° C. As used herein, the term "stable dispersion" or "stably dispersed" means that the polymer-enclosed particles neither settle nor coagulate nor flocculate from the aqueous medium upon standing.

In certain embodiments, the polymer-enclosed color-imparting particles are present in the aqueous dispersion in an amount of at least 10 weight percent, or in an amount of 10 to 80 weight percent, or in an amount of 25 to 50 weight percent, or in an amount of 25 to 40 weight percent, with weight percents being based on weight of total solids present in the dispersion.

In the foregoing methods, upon reaction of the ethylenically unsaturated monomer with the polymerizable dispersant, polymer-enclosed color-imparting particles are formed, which, as previously indicated, the inventors believe results in a phase barrier that physically prevents the particles, particularly nanoparticles, from re-agglomerating within the aqueous dispersion and, likewise, the resulting ink composition. As a result, the foregoing methods result in an aqueous dispersion of polymer-enclosed color-imparting particles, such as nanoparticles, wherein reagglomeration of the nanoparticles is minimized or avoided altogether.

In addition to the previously described colorants, the ink jet ink compositions of the present invention may also include pigments and dyes of the type standardly used in ink jet printing. Examples of these materials are set forth in United States Patent Application Publication No. 2002/0193514 A1 at [0031] and [0032], the cited portion of which being incorporated herein by reference. In other embodiments, however, the ink compositions of the present invention are substantially free of, or, in some cases, completely free of either of these standard colorants. As used herein, the term "substantially free" means that the material being discussed is present in another substance, if at all, as an incidental impurity. In other words, the material does not effect the properties of the other substance. As used herein, the term "completely free" means that the material is not present in the other substance at all.

In certain embodiments, the ink compositions of the present invention are substantially free of, or, in some cases, completely free of any film-forming polymers, any core/shell polymer and/or any encapsulated dye particles. Film forming polymers may clog the print head of an ink jet printer and, therefore, the ink compositions of the present invention are often substantially free or, in some cases, completely free of such materials.

The ink compositions of the present invention may be embodied, for example, as an ink jet ink composition for use in ink jet printing wherein liquid ink drops are applied in a controlled fashion to an ink receptive substrate, by ejecting ink droplets from a plurality of nozzles, or orifices, in a print head of an ink jet printer.

Commercially available ink jet printers use several different methods to control the deposition of the ink droplets. Such methods are generally of two types: continuous stream and drop-on demand. In drop-on-demand systems, a droplet of ink is ejected from an orifice directly to a position on the ink receptive substrate by pressure created by, for example, a piezoelectric device, an acoustic device, or a thermal process controlled in accordance with digital data signals. An ink droplet is not generated and ejected through the orifices of the print head unless it is needed. Ink jet printing methods, and related printers, are commercially available and need not be described in detail.

Inkjet ink compositions of the present invention can be employed in inkjet printing wherein liquid ink drops are applied in a controlled fashion to an ink receptive substrate, by ejecting ink droplets from a plurality of nozzles, or orifices, in a print head of an ink jet printer.

Ink-receptive substrates useful in ink jet printing are disclosed in U.S. Pat. Nos. 5,605,750; 5,723,211; 5,789,070; and EP 813 978 A1, the portions of which that describe such substrates being incorporated herein by reference.

Illustrating the invention are the following examples that are not to be considered as limiting the invention to their details. All parts and percentages in the examples, as well as throughout the specification, are by weight unless otherwise indicated.

EXAMPLE 1

Polyurethane Dispersion

This example describes the preparation of a polyurethane dispersion that was subsequently used to the form the polyurethane/nanopigment dispersions of Example 2. The polyurethane dispersion was prepared from the following mixture of ingredients in the ratios indicated:

| Ingredients | Weight (grams) |
| --- | --- |
| Charge I | |
| Poly (neopentylglycol adipate)[1] | 780.0 |
| Dimethylolpropionic acid (DMPA) | 280.7 |
| Tri-ethylamine | 127.1 |
| Butylated hydroxytoluene | 2.5 |
| Triphenyl phosphite | 2.5 |

-continued

| Ingredients | Weight (grams) |
| --- | --- |
| Charge II | |
| Hydroxyethyl methacrylate (HEMA) | 116.7 |
| Butyl methacrylate | 791.2 |
| Charge III | |
| Methylene bis(4-cyclohexylisocyanate) | 1175.1 |
| Charge IV | |
| Butyl methacrylate | 57.5 |
| Charge V | |
| Deionized water | 4734.8 |
| Ethylenediamine | 49.2 |
| Dimethylethanolamine | 40.6 |
| Charge VI | |
| Butyl methacrylate | 50 |

[1]Poly (neopentylglycol adipate) having a number average molecular weight of 1000.

The polyurethane dispersion was prepared in a four neck round bottom flask equipped with an electronic temperature probe, mechanical stirrer, condenser, and a heating mantle. Charge I was stirred 5 minutes in the flask at a temperature of 90° C. Charge II was added and the mixture was cooled to 60° C. Charge III was added over a 10 minute period. Charge IV was added and the resulting mixture was gradually heated to 90° C. over 45 minutes and then held at 90° C. for 3 hours. Charge V was stirred in a separate flask and heated to 80° C. 3000.0 g of the reaction product of Charges I, II, III, and IV was added to Charge V over 30 minutes. Charge VI was added and the resulting mixture was cooled to room temperature. The final product was a translucent emulsion with an acid value of 12.1, a Brookfield viscosity of 872 centipoise (spindle #3 at 30 rpm), a pH of 7.75, and a nonvolatile content of 29.4% as measured at 110° C. for one hour.

EXAMPLE 2

Polyurethane/Nanopigment Dispersion

This example describes the preparation of a nano-sized PR 122 quinacridone magenta pigment dispersion. The dispersion was prepared from the following mixture of ingredients in the ratios indicated:

| Ingredients | Weight (grams) |
| --- | --- |
| Charge I | |
| Polyurethane dispersion of Example 1 | 4772.7 |
| Deionized water | 2304.5 |
| Hydroquinone methyl ether (MEHQ) | 1.36 |
| PR 122 pigment[3] | 700.0 |
| Shellsol OMS (Shell Chemical Co.) | 86.4 |
| Charge II | |
| Deionized water | 71.5 |
| t-Butyl hydroperoxide (70% aqueous solution) | 5.8 |
| Charge III | |
| Deionized water | 337.2 |
| Ferrous ammonium sulfate | 0.13 |
| Sodium metabisulfite | 8.18 |

[3]Commercially available from Clariant Corporation.

The ingredients were mixed using a 4.5 inch Cowles blade attached to an air motor. The mixture was then pre-dispersed Premier Mill PSM-11 basket mill containing 353 mL of 1.2-1.7 mm Zirconox YTZ® milling media for 1.5 hours at 1000 fpm for the mix blades and 960 rpm pump speed and then recycled through an Advantis V15 Drais mill containing 500 mL of 0.3 mm Zirconox YTZ® grinding media in a one liter grinding chamber. The mixture was milled at 1260 fpm with a pump setting of 19 rpm for a total time of 15 hours. The progress of the milling was monitored by visually observing changes in the transparency of thin films of samples drawn down over black and white Leneta paper. Charge II was added and the resulting mixture was stirred 5 minutes. Charge III was added in two aliquots over 5 minutes. The final product was a magenta liquid with a Brookfield viscosity of 28.1 centipoise (spindle #3 at 30 rpm), a pH of 7.61, and a non-volatile content of 28.2% as measured at 110° C. for one hour.

EXAMPLE 3

An ink composition was prepared by adding the following ingredients, in the order shown, into a 2 oz glass jar. Then the ingredients were mixed together. This final mixture (the trial ink) was poured through a 1 micron nylon mesh filter bag.

| Description | WT % of Total |
| --- | --- |
| Triethylene glycol | 23.00 |
| Glycerol | 10.00 |
| Dowanol DPM | 2.50 |
| Strodex PK-90 | 0.20 |
| Pigment Red 122 encapsulated tint | 23.39 |
| DI water | 40.91 |
| Total | 100.00 |

The magenta ink reservoir of an HP (Hewlett Packard) 95 ink jet cartridge was refilled with this ink and printed on an HP Deskjet 5940 ink jet printer. A monochrome test pattern was printed using the magenta ink. The printed test pattern image quality was comparable to that when using the HP 95 print cartridge with HP magenta ink.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. An ink composition comprising:
   (a) a vehicle; and
   (b) a colorant,
   wherein the colorant comprises polymer-enclosed color-imparting particles, wherein the particles are enclosed by a friable polymer comprising the reaction product of:
   (i) water-dispersible ethylenically unsaturated polymer; and
   (ii) an ethylenically unsaturated monomer.

2. The ink composition of claim 1, wherein the composition is an ink jet ink composition.

3. The ink composition of claim 1, wherein the polymer-enclosed color-imparting particles comprise nanoparticles.

4. The ink composition of claim 3, wherein the nanoparticles have an average particle size of 300 nanometers or less.

5. The ink composition of claim 1, wherein the particles comprise an organic pigment.

6. An ink composition comprising:
   (a) a vehicle; and
   (b) a colorant,
   wherein the colorant comprises polymer-enclosed color-imparting particles, wherein the particles are enclosed by a friable polymer comprising the reaction product of:
   (i) a polymerizable polyester polyurethane, and
   (ii) an ethylenically unsaturated monomer.

7. The ink composition of claim 6, wherein the polymerizable polyester polyurethane has a weight average molecular weight of 10,000 to 100,000 grams per mole.

8. The ink composition of claim 1, wherein the polymer-enclosed color-imparting particles are introduced into the ink composition in the form of an aqueous dispersion of the particles.

9. The ink composition of claim 1, wherein the aqueous dispersion is substantially free of a surfactant.

10. The ink composition of claim 1, wherein the ink composition is substantially free of a film-forming polymer.

11. A method for improving the transparency of an ink composition comprising a pigment colorant, comprising including in the ink composition polymer-enclosed color-imparting particles, wherein the particles are enclosed by a friable polymer comprising the reaction product of:
    (i) a water-dispersible ethylenically unsaturated polymer; and
    (ii) an ethylenically unsaturated monomer.

12. An ink composition comprising:
    (a) 0.5 to 10 percent by weight of a colorant comprising polymer-enclosed color-imparting particles, wherein the particles are enclosed by a friable polymer comprising the reaction product of:
       (i) a water-dispersible ethylenically unsaturated polymer; and
       (ii) an ethylenically unsaturated monomer;
    (b) 0.1 to 50 percent by weight of an organic solvent;
    (c) up to 10 percent by weight of a surfactant, and
    (d) water.

13. A method for making an ink composition comprising:
    (a) providing an aqueous dispersion of polymer-enclosed color-imparting particles comprising a friable polymer, wherein the aqueous dispersion is prepared by a method comprising either:
       (A) providing a mixture, in an aqueous medium, of (i) color-imparting nanoparticles, (ii) one or more polymerizable, ethylenically unsaturated monomers; and/or (iii) a mixture of one or more polymerizable unsaturated monomers with one or more polymers; and/or (iv) one or more polymers, and then subjecting the admixture to high stress shear conditions in the presence of an aqueous medium to particularize the admixture into polymer-enclosed color-imparting particles; or
       (B) providing a mixture, in an aqueous medium, of (i) color-imparting particles, (ii) a polymerizable ethylenically unsaturated monomer, and (iii) a water-dispersible ethylenically unsaturated polymer; forming the color-imparting particles into nanoparticles; and polymerizing the ethylenically unsaturated monomer and the ethylenically unsaturated polymer to form polymer-enclosed color-imparting particles comprising a water-dispersible polymer; and (b) combining the aqueous dispersion of polymer-enclosed color-imparting particles with other components of the ink composition.

14. The ink composition of claim 1, wherein the water-dispersible ethylenically unsaturated polymer comprises acid groups that are neutralized with a base.

15. The method of claim 11, wherein the water-dispersible ethylenically unsaturated polymer comprises acid groups that are neutralized with a base.

16. The ink composition of claim 12, wherein the water-dispersible ethylenically unsaturated polymer comprises acid groups that are neutralized with a base.

17. The method of claim 13, wherein the water-dispersible ethylenically unsaturated polymer comprises acid groups that are neutralized with a base.

* * * * *